United States Patent [19]

Tarnow et al.

[11] 3,912,779
[45] Oct. 14, 1975

[54] 3-AMINO-2,4,6-TRICHLORO-BENZALDEHYDE-SULFONYLHYDRAZONES

[75] Inventors: Horst Tarnow, Langenfeld; Gunther Hermann, Opladen, both of Germany

[73] Assignee: Bayer Aktiengesellschaft, Leverkusen, Germany

[22] Filed: June 27, 1973

[21] Appl. No.: 374,195

[30] Foreign Application Priority Data
Feb. 13, 1973 Germany............................ 2306918

[52] U.S. Cl... 260/556 H; 260/397.7 R; 260/543 R; 260/566 B; 260/566 D; 260/578; 424/228; 424/321
[51] Int. Cl.². .................................. C07C 143/825
[58] Field of Search.................. 260/556 H, 397.7 R

[56] References Cited
UNITED STATES PATENTS
3,709,936    1/1973    Fridinger et al. ................ 260/556 H
FOREIGN PATENTS OR APPLICATIONS
701,145    12/1953    United Kingdom............. 260/556 H
1,221,212    1/1967    Germany
2,044,834    3/1972    Germany Primary Examiner—Sherman D. Winters
Attorney, Agent, or Firm—Burgess, Dinklage & Sprung

[57] ABSTRACT 3-amino-2,4,6-trichloro-benzaldehyde-sulfonylhydrazones of the formula

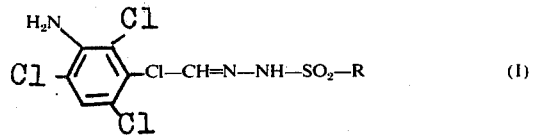

in which
R is an optionally halogen-substituted alkyl radical of 1–4 carbon atoms, or an aryl radical which is optionally substituted by one or more alkyl or haloalkyl radicals of 1–4 carbon atoms, halogen or $NO_2$ radicals, which possess anti-leporine, anti-rodent and insecticidal properties.

5 Claims, No Drawings

3-AMINO-2,4,6-TRICHLORO-BENZALDEHYDE-SULFONYLHYDRAZONES

The present invention relates to and has for its objects the provision of particular new 3-amino-2,4,6-trichloro-benzaldehyde-sulfonylhydrazones which possess anti-leporine, anti-rodent and insecticidal properties, active compositions in the form of mixtures of such compounds with solid and liquid dispersible carrier vehicles, and methods for producing such compounds and for using such compounds in a new way especially for combating pests, e.g. leporine animals, rodents and insects, with other and further objects becoming apparent from a study of the within specification and accompanying examples.

It is known to use zinc phosphide (Compound A), α-naphthylthiourea (Compound B) or 5-(α-hydroxy-α-pyridylbenzyl)-7-(α-2-pyridylbenzylidene)-5-norbornene-2,3-dicarboximide (Compound C, common name Norbormid) as active compounds in rodenticides (compare Steiniger, F.: Rattenbiologie und Rattenbekampfung ("The Biology and combating of Rats"), Enke-Verlag Stuttgart, 1952, page 92; Richeter, C.P.: Journal Am. Med. Assoc. Volume 129, page 927 (1945); Maddock, D.R. et al: Pest Control, Volume 35, No. 8. page 22 (1967)).

However, the activity of these active compounds known and employed in practice is frequently unsatisfactory, especially if low concentrations are used.

The present invention provides benzaldehyde-sulfonylhydrazones of the general formula

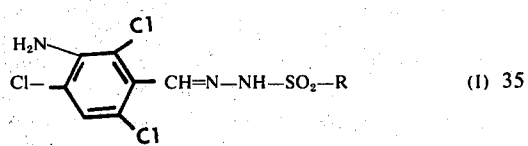

in which
R is an optionally halogen-substituted alkyl radical of 1–4 carbon atoms, or an aryl radical which is optionally substituted by one or more alkyl or haloalkyl radicals of 1–4 carbon atoms, halogen or $NO_2$ radicals. R preferably is optionally chlorine-substituted alkyl of 1–4 carbon atoms, or aryl, especially phenyl or naphthyl, which is optionally substituted by one or more methyl, $CF_3$, chlorine and/or nitro radicals.

Surprisingly, the benzaldehyde-sulfonylhydrazones according to the invention show a substantially greater rodenticidal action than the active compounds zinc phosphide, α-naphthylthiourea and Norbormid known in the art. The compounds according to the invention thus represent an enrichment of the art.

The invention also provides a process for the production of a benzaldehydesulfonylhydrazone of the formula (I) in which
a. 3-amino-2,4,6-trichloro-benzaldehyde of the formula

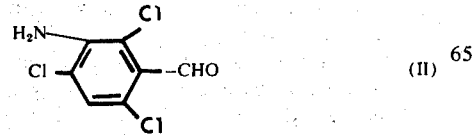

is reacted with a sulfonic acid hydrazide of the general formula $H_2N—NH—SO_2—R$ (III)

in which
R has the abovementioned meaning, optionally in the presence of a diluent and/or an acid catalyst,
or
b. 3-amino-2,4,6-trichloro-benzaldehyde-hydrazone of the formula

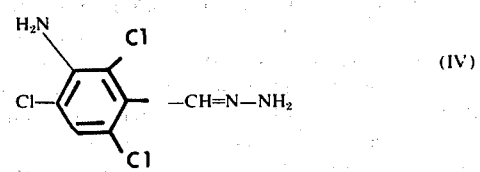

is reacted with a sulfonic acid chloride of the general formula $Cl—SO_2—R$ (V)

in which
R has the abovementioned meaning, optionally in the presence of an acid-binding agent and/or a diluent.

If 3-amino-2,4,6-trichloro-benzaldehyde and benzene-sulfonic acid hydrazide are used as starting substances, the course of the reaction in process variant (a) can be represented by the following formula scheme:

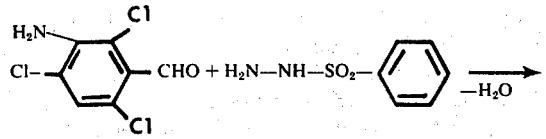

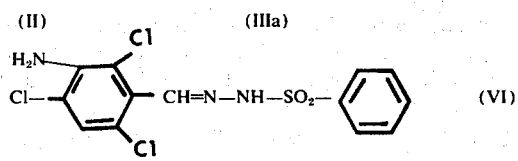

If 3-amino-2,4,6-trichloro-benzaldehyde-hydrazone and 3-trifluoromethyl-4-chloro-benzene sulfonic acid chloride are used as starting substances, the course of the reaction in process variant (b) can be represented by the following formula scheme:

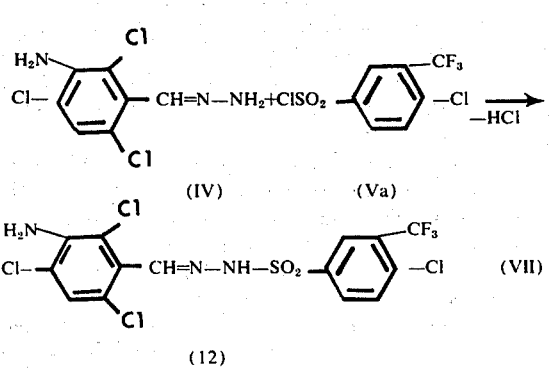

The compound 3-amino-2,4,6-trichloro-benzaldehyde-hydrazone to be used as starting substance and defined by the formula (IV) is new and has not previously been described in the literature.

3-amino-2,4,6-trichloro-benzaldehyde-hydrazone of the formula (IV) is obtained when 3-amino-2,4,6-trichloro-benzaldehyde is reacted with hydrazine hydrate in ethanol in the presence of glacial acetic acid. The preparation of 3-amino-2,4,6-trichloro-benzaldehyde of the formula (II) is the subject of German Application P23 06 919.4, filed Feb. 13, 1973 It is obtained by subjecting 2,4,6-trichloro-3-dichloromethyl-phenyl-iso-cyanide-dichloride to hydrolysis with sulfuric acid at elevated temperature. e.g. 1 mole of 2,4,6-trichloro-3-dichloromethyl-phenyl-isocyanide dichloride is added dropwise to 1500 g of concentrated sulfuric acid at 90°–100°C; after 4–6 hours the solution is added dropwise to ice water and the 3-amino-2,4,6-trichlorobenzaldehyde precipitates out The sulfonic acid hydrazides and sulfonic acid chlorides to be used as starting substances are defined by the formulae (III) and (V). These compounds are generally known.

Possible diluents for the reaction in process variant (a) are inert polar organic solvents. Preferred examples include alcohols such as methyl alcohol and ethyl alcohol; ethers such as dibutyl ether and dioxane; ketones such as acetone and methyl ethyl ketone; and nitriles such as acetonitrile and propionitrile. For the reaction in process variant (b), preferred additional examples include hydrocarbons, such as benzine, benzene and xylene; and chlorinated hydrocarbons such as methylene chloride and chlorobenzene.

The reaction of 3-amino-2,4,6-trichloro-benzaldehyde with sulfonic acid hydrazides in process variant (a) is preferably carried out in the presence of an acid catalyst such as an inorganic mineral acid, for example HCl or $H_2SO_4$, or an organic acid such as formic acid, acetic acid or p-toluene-sulfonic acid.

All customary acid-binding agents can be used as acid-binding agents for the reaction in process variant (b). Preferred examples include alkali metal hydroxides and alkaline earth metal hydroxides, alkali metal carbonates, metal alcoholates such as sodium methylate, and tertiary amines such as triethylamine and pyridine.

The reaction temperatures can be varied over a wide range in both process variants. In general, the reaction is carried out at 0° to 150°C, preferably 50° to 100°C.

The reactions usually take place under normal pressure but can also be carried out in closed vessels under elevated pressure.

In carrying out process variant (a), 1 mole of sulfonic acid hydrazide is preferably used for each mole of 3-amino-2,4,6-trichloro-benzaldehyde. The reaction mixture may be worked up in the usual manner, for example by filtering off, or by distilling off the diluent and recrystallising the residue.

In carrying out process variant (b), 1 mole of sulfonic acid chloride is preferably employed for each mole of 3-amino-2,4,6-trichlorobenzaldehyde-hydrazone. The acid-binding agent may also be employed in equimolar amount. The reaction mixture may be worked up in the usual manner, for example by adding water and filtering off the precipitate.

In addition to rodenticidal properties, the active compounds according to the invention also show insecticidal properties.

They are particularly suitable for combating leporine animals (Lagomorpha) and rodents (Rodentia), such as squirrel-like animals (Sciuroidae), gophers (Geomyoidae) and mouse-like animals (Muroidae) with which there are classed essentially the dormouse-like animals (Muscardinidae) and the mice (Muridae).

The leporine animals include essentially the Leporidae, such as the rabbit (*Oryctolagus cuniculus*), the squirrel-like animals, for example the European souslik (*Citellus citellus*) and the ground squirrel (*Citellus lateralis*), and the gophers include for example the mountain pocket gopher (*Thomomys talpoides*).

With the dormouse-like animals there is classed for example the fat dormouse (*Glis glis*).

The mice category includes, in the group of the long-tailed mice (Murinae), rats (Rattus spec.), such as the black rat (*Rattus rattus*) and the Norway rat (*Rattus norvegicus*); house mice (Mus spec.) such as *Mus musculus*; in the group of the hamster-like animals (Cricetinae) the European hamster;(*Cricetus cricetus*) and in the group of the short-tailed mice (Microtinae) for example the common vole (*Microtus arvalis*), the field vole (*Microtus agrestis*) and the water vole (*Arvicola terrestris*).

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose; aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e. g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g acetone, methyl ethyl ketone, methyl isobutyl ketone, cyclohexanone, etc.), and/or water; as well as inert dispersible finely divided solid carriers, such as ground natural mineral (e.g. kaolins, clays, alimina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and-/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other anti-leporine and anti-rodent agents and insecticides, or acaricides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001–20%, preferably 0.005–5%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 5 to about 60% by weight of the active compound or even the 100% active substance alone, e.g. about 5–100% by weight of the active compound.

Furthermore, the present invention contemplates methods of selectively killing, combating or controlling pests, e.g. leporine animals, rodents and insects, and more particularly methods of combating at least one of leporine animals and rodents, which comprises applying to at least one of correspondingly (a) such leporine animals, (b) such rodents, (c) such insects, and the corresponding habitat thereof, i.e. the locus to be protected, a correspondingly combative or toxic amount, i.e. a pesticidally effective amount, of the particular active compound of the invention alone or together with a carrier vehicle as noted above. The instant formulations or compositions may be applied in the customary manner, for example by atomizing, spraying, watering, dusting and sprinkling, poisoning of drinking water or above-ground or subterranean laying-down of bait which is eaten or played with, and into which the active compounds have been incorporated, and also by fumigating in buldings or subterranean structures.

The formulations may be in the form of baits incorporating the active compound; examples of baits of animal and vegetable origin which may be used are milled cereal products or meat meal and fish meal.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1 a.

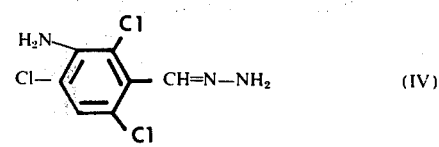

(IV)

22.5 g (0.1 mole) of 3-amino-2,4,6-trichloro-benzaldehyde were dissolved in 100 ml of ethanol with addition of 5 ml of glacial acetic acid. 7 g of hydrazine hydrate were added dropwise thereto. After heating for 5 hours to the reflux temperature, 3-amino-2,4,6-trichloro-benzaldehyde-hydrazone precipitated as a thick white precipitate.

Yield: 20 g = 84% of theory (analytically pure). Melting point: 183°–185°C

EXAMPLE 1 b.

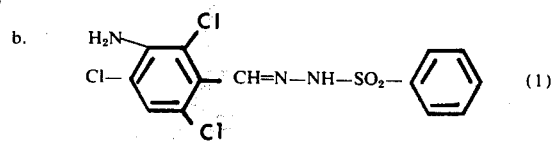

(1)

22.5 g (0.1 mole) of 3-amino-2,4,6-trichloro-benzaldehyde and 17.2 g (0.1 mole) of benzene sulfonic acid hydrazide in 200 ml of ethanol were heated, with addition of 10 ml of glacial acetic acid, for 6 hours under reflux. After cooling, the colorless 3-amino-2,4,6-trichloro-benzaldehyde-benzene-sulfonyl-hydrazone formed was filtered off and rinsed with a little ethanol.

Yield; 31 g = 82% of theory (analytically pure). Melting point: 190°–192°C.

The following compounds were obtained analogously:

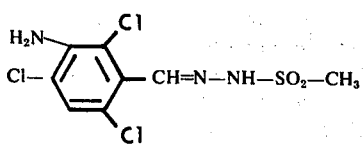
Melting point:
162 – 164°C (2)

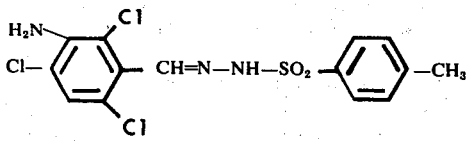
Melting point:
174 – 176°C (3) (decomposition)

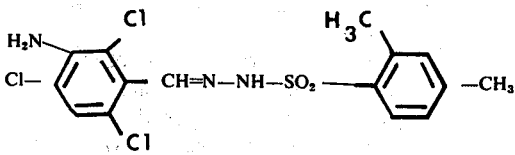
Melting point:
190°C (4) (decomposition)

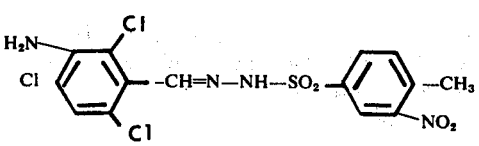
Melting point:
174 – 176°C (decomposition) (5)

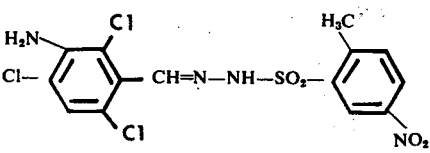
Melting point:
188 – 190°C (6) (decomposition)

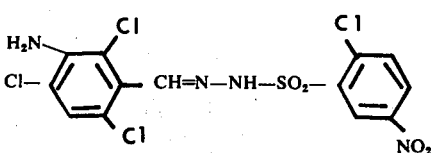
Melting point:
216 – 218°C (7)

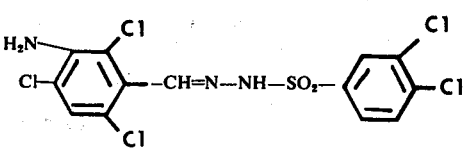
Melting point:
165°C (8) (decomposition)

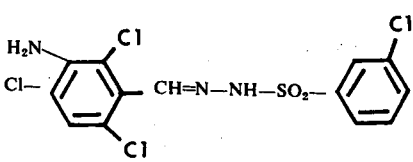
Melting point:
157°C (9) (decomposition)

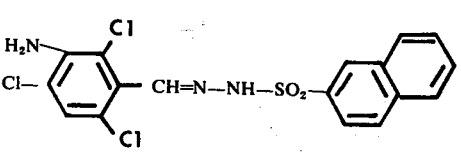
Melting point:
162 – 164°C (10)

EXAMPLE 2

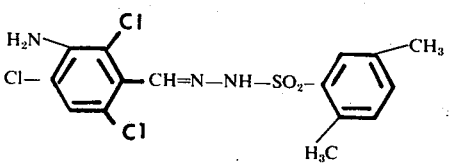
(11)

22.5 g (0.1 mole) of 3-amino-2,4,6-trichlorobenzaldehyde and 20 g (0.1 mole) of 2,5-dimethylbenzene sulfonic acid hydrazide in 200 ml of ethanol were heated, with addition of 10 ml of glacial acetic acid, for 6 hours under reflux. In the course thereof, complete solution occurred. The diluent was removed in vacuo and the solid residue was recrystallized from ethanol. The colorless 3-amino-2,4,6-trichlorobenzaldehyde-2′,5′-dimethyl-benzenesulfonyl-hydrazone was obtained in a yield of 79% of theory. Melting point: 208°–210°C (decomposition).

EXAMPLE 3

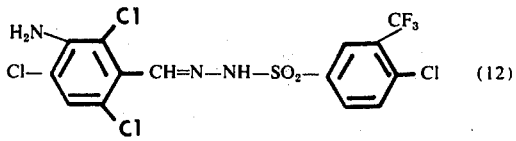

(12)

24 g (0.1 mole) of 3-amino-2,4,6-trichloro-benzaldehyde-hydrazone were dissolved in 200 ml of dioxane with addition of 14 ml of triethylamine. A solution of 28 g (0.1 mole) of 3-trifluoromethyl-4-chloro-benzenesulfonic acid chloride in 50 ml of dioxane was added dropwise at 20°C. After warming to 50°–60°C for 5 hours, the mixture was poured onto ice water and the precipitate was filtered off and recrystallized from xylene. The pale yellow-colored 3-amino-2,4,6-trichloro-benzaldehyde-3′-trifluoromethyl-4′-chloro-benzenesulfonyl-hydrazone was obtained in a yield of 77% of theory.
Melting point: 183°–185°C.

The following compounds was obtained analogously:

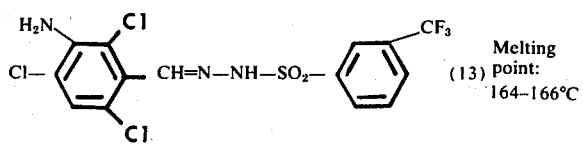

(13) Melting point: 164–166°C

EXAMPLE 4

Ingestion test/albino rat

Test animal: albino rat (*Rattus norvegicus*)

To produce a suitable preparation of active compound, 3 parts by weight of active compound were mixed with 2.8 parts by weight of highly disperse silica and 4.2 parts by weight of talc. This concentrate, containing 30 percent by weight of active compound, was brought to the particular desired concentration of active compound by means of a pulverulent commercially available standard rat diet.

50 gram portions of the poison bait thus prepared were presented to four (4) separately kept albino rats in an automatic feeding device. No untreated food was available to the animals, while they received water ad libitum. The forced test lasted for 72 hours and the post-observation time with normal feeding with untreated standard rat diet was 7 days calculated from the end of the forced test.

In deciding the dosage of the active compound, the previously determined $LD_{100}$ (active compound dose with which 100% of the treated rats were killed) was taken into account by arranging that 4 grams of bait contained the amount of poison which was reliably lethal to a rat weighing 200 grams. In that case, rats took up the lethal amount of poison under natural feeding behavior if the poison did not repel them from eating the bait. The degree of destruction is a measure of the acceptance of the bait: 100% destruction means very good acceptance and 0% a poor, inadequate acceptance.

The active compounds, $LD_{100}$ values, active compound concentrations in the bait and achieved destruction can be seen from the table which follows:

Table

| Active compound | Ingestion test/albino rat | | |
|---|---|---|---|
| | $LD_{100}$ mg/kg (rat) | Active compound concentration in the bait, % | Destruction, % n = 4 |
| Zinc phosphide (known) (A) | 75 | 0.375 | 0 |
| α-Naphthylthiourea (known) (B) | 10 | 0.05 | 0 |
| Norbormid (known) (C) | 30 | 0.15 | 0 |
| (1) | 75 | 0.375 | 100 |
| (2) | 10 | 0.05 | 50 |
| (3) | 20 | 0.1 | 75 |

Table -Continued

| Active compound | Ingestion test/albino rat | | |
|---|---|---|---|
| | $LD_{100}$ mg/kg (rat) | Active compound concentration in the bait, % | Destruction, % n = 4 |
| (6) H₂N-, Cl-, Cl, Cl-benzene-CH=N-NH-SO₂-(4-NO₂-3-CH₃-phenyl) | 100 | 0.5 | 100 |
| (11) H₂N-, Cl-, Cl, Cl-benzene-CH=N-NH-SO₂-(2,4-dimethylphenyl) | 20 | 0.1 | 50 |
| (10) H₂N-, Cl-, Cl, Cl-benzene-CH=N-NH-SO₂-naphthyl | 40 | 0.2 | 50 |
| (12) H₂N-, Cl-, Cl, Cl-benzene-CH=N-NH-SO₂-(CF₃, Cl-phenyl) | 40 | 0.2 | 50 |
| (13) H₂N-, Cl-, Cl, Cl-benzene-CH=N-NH-SO₂-(CF₃-phenyl) | 40 | 0.2 | 75 |
| (9) H₂N-, Cl-, Cl, Cl-benzene-CH=N-NH-SO₂-(Cl-phenyl) | 20 | 0.1 | 50 |
| (8) H₂N-, Cl-, Cl, Cl-benzene-CH=N-NH-SO₂-(2,4-dichlorophenyl) | 80 | 0.4 | 100 |

It will be appreciated that the instant specification and examples are set forth by way of illustration and not limitation, and that various modifications and changes may be made without departing from the spirit and scope of the present invention.

What is claimed is:

1. A benzaldehyde-sulfonylhydrazone of the formula

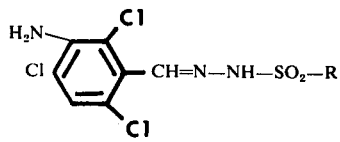

(I)

in which
R is an optionally halogen-substituted alkyl radical of 1-4 carbon atoms, or a phenyl or naphthyl radical which is optionally substituted by one or more alkyl or haloalkyl radicals of 1-4 carbon atoms, halogen or NO₂ radicals.

2. A compound according to claim 1 in which R is an optionally chlorine-substituted alkyl radical, or a phenyl or naphthyl radical which is optionally substituted by at least one methyl, CF₃, chlorine or nitro radical.

3. The compound according to claim 1, wherein such compound is 3-amino-2,4,6-trichloro-benzaldehyde-benzene-sulfonyl-hydrazone of the formula

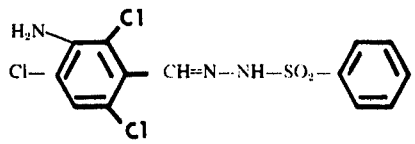
(1)
4. The compound according to claim 1, wherein such compound is 3-amino-2,4,6-trichloro-benzaldehyde-2'-methyl-5'-nitro-benzene-sulfonyl-hydrazone of the formula
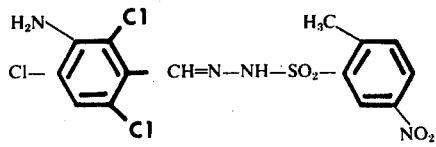
(6)
5. The compound according to claim 1, wherein such compound is 3-amino-2,3',4,4', 6-pentachloro-benzaldehyde-benzene-sulfonyl-hydrazone of the formula
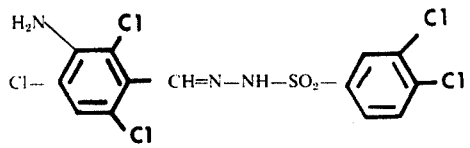
(8)
* * * * *